US011251673B2

(12) United States Patent
Suzuki et al.

(10) Patent No.: US 11,251,673 B2
(45) Date of Patent: Feb. 15, 2022

(54) ACTUATOR FOR IN-VEHICLE UNIT

(71) Applicant: HITACHI AUTOMOTIVE SYSTEMS, LTD., Hitachinaka (JP)

(72) Inventors: Tatsuro Suzuki, Atsugi (JP); Masaki Kashima, Novi, MI (US); Eiichiro Ito, Atsugi (JP); Tatsuro Mitsuhira, Atsugi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 121 days.

(21) Appl. No.: 16/554,459

(22) Filed: Aug. 28, 2019

(65) Prior Publication Data

US 2020/0099269 A1 Mar. 26, 2020

(30) Foreign Application Priority Data

Sep. 20, 2018 (JP) .............................. JP2018-175816

(51) Int. Cl.
| | |
|---|---|
| *H02K 5/06* | (2006.01) |
| *H02K 5/10* | (2006.01) |
| *H02K 7/06* | (2006.01) |
| *H02K 11/215* | (2016.01) |
| *B62D 5/04* | (2006.01) |

(Continued)

(52) U.S. Cl.
CPC ................ *H02K 5/06* (2013.01); *H02K 5/10* (2013.01); *H02K 7/06* (2013.01); *H02K 11/215* (2016.01); *B62D 5/0406* (2013.01); *B62D 5/0448* (2013.01); *F16H 25/2204* (2013.01); *F16H 2025/2081* (2013.01);

(Continued)

(58) Field of Classification Search
CPC .. H02K 5/06; H02K 5/10; H02K 7/06; H02K 11/215; H02K 2205/12; H02K 2205/09; H02K 7/003; H02K 11/21; B62D 5/0406; B62D 5/0448; B62D 5/0403; F16H 2025/2081; F16H 25/2204; F16H 2025/2096
USPC ...................................................... 310/68 B
See application file for complete search history.

(56) References Cited

U.S. PATENT DOCUMENTS

| | | | | |
|---|---|---|---|---|
| 3,568,040 A | * | 3/1971 | Combs .................. | H02K 53/00 322/3 |
| 2014/0125267 A1 | * | 5/2014 | Suzuki ................... | B60L 50/16 318/400.39 |

(Continued)

FOREIGN PATENT DOCUMENTS

| | | | |
|---|---|---|---|
| JP | 2017-051014 A | | 3/2017 |
| JP | 2018057055 | * | 4/2018 |

*Primary Examiner* — Ahmed Elnakib
(74) *Attorney, Agent, or Firm* — Foley & Lardner LLP

(57) ABSTRACT

A motor is contained in a motor container space. A controller is contained in a controller container space. The motor container space and the controller container space are arranged in series in a direction of a rotation axis of a motor shaft, while interposing a partition wall therebetween. The motor shaft is inserted in a motor shaft through-hole of the partition wall. A magnet is disposed at an end of the motor shaft, in the controller container space. A rotation sensor is disposed in the controller container space oppositely to the magnet, for monitoring a rotational position of the motor shaft on the basis of variation in magnetic field due to rotation of the magnet. A cover made of nonmagnetic metal is disposed between the magnet and the rotation sensor so as to cover the motor shaft through-hole.

12 Claims, 8 Drawing Sheets

(51) Int. Cl.
*F16H 25/20* (2006.01)
*F16H 25/22* (2006.01)

(52) U.S. Cl.
CPC .. *F16H 2025/2096* (2013.01); *H02K 2205/09* (2013.01); *H02K 2205/12* (2013.01)

(56) References Cited

U.S. PATENT DOCUMENTS

2017/0040874 A1* 2/2017 Han .................. G01D 11/30
2017/0349211 A1* 12/2017 Shiino ............... B62D 15/0235
2019/0210636 A1* 7/2019 Hamada ............. H02K 5/225

* cited by examiner

ACTUATOR FOR IN-VEHICLE UNIT

BACKGROUND

The present invention relates to an actuator for an in-vehicle unit.

Japanese Patent Application Publication 2017-51014 A discloses a motor controller including a resin cover structured to cover: a magnet disposed at one end of a motor shaft extending through a motor shaft through-hole formed in a partition wall interposed between a motor housing and a controller housing; and the motor shaft through-hole.

SUMMARY

Such motor controller includes a combination of the metal motor housing and the resin cover, which may increase the motor controller in size of assembling parts in view of airtightness and deteriorate the motor controller in ease of layout. In view of foregoing, it is desirable to provide an actuator for in-vehicle unit which is improved in ease of layout.

According to embodiments of the present disclosure, the actuator includes a cover structured to cover the magnet and the motor shaft through-hole, and made of nonmagnetic metal.

This allows the actuator to be smaller in size and improved in ease of layout.

According to one aspect of the present disclosure, an actuator for an in-vehicle unit comprises: a motor including a rotor, a stator, and a motor shaft, wherein the motor shaft includes a motor shaft first end and a motor shaft second end that are ends in a direction of a rotation axis of the motor shaft; a housing including a motor container space, a controller container space, and a partition wall, wherein the partition wall includes a motor shaft through-hole; a magnet set to rotate with the motor shaft, and including a pair of north pole and south pole arranged in a circumferential direction around the rotation axis of the motor shaft; a rotation sensor configured to monitor a rotational position of the motor shaft, based on variation in magnetic field from the magnet due to rotation of the magnet; a controller configured to output a command signal to the stator, based on a signal from the rotation sensor; and a cover made of nonmagnetic metal and structured to cover the motor shaft through-hole of the partition wall; wherein: the motor is contained in the motor container space; the motor container space and the controller container space are arranged in series in the direction of the rotation axis of the motor shaft; the partition wall is formed between the motor container space and the controller container space, in the direction of the rotation axis of the motor shaft; the motor shaft is inserted in the motor shaft through-hole of the partition wall; the magnet is disposed at the motor shaft first end nearer to the controller container space than the motor shaft second end; the rotation sensor is located in the controller container space, oppositely to the magnet in the direction of the rotation axis of the motor shaft; the controller is contained in the controller container space; and the cover is disposed on the partition wall and between the magnet and the rotation sensor in the direction of the rotation axis of the motor shaft.

DETAILED DESCRIPTION

The following describes the embodiments of the present disclosure with reference to the drawings.

First Embodiment

Figure 1:
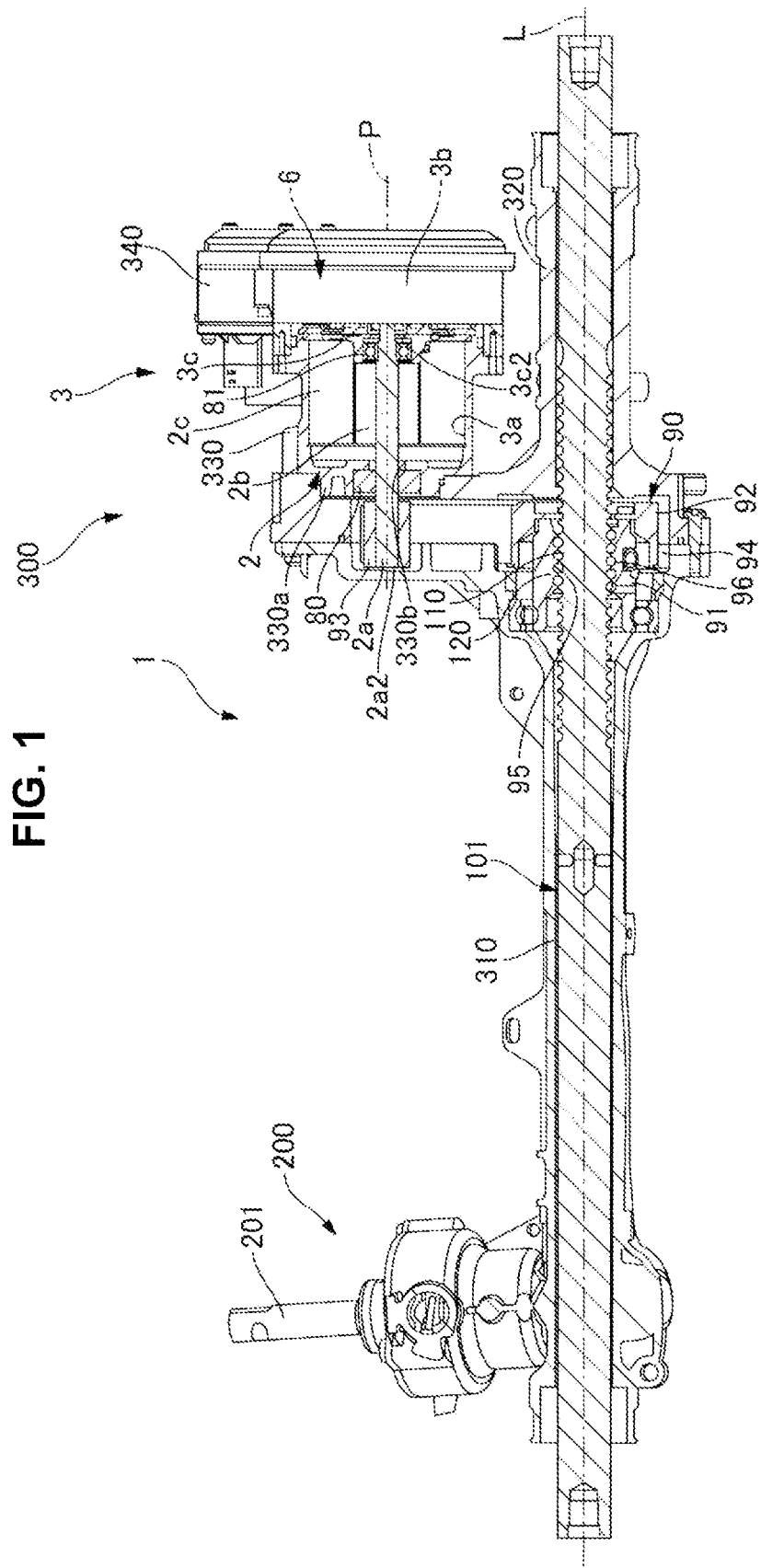
FIG. 1 is a longitudinal sectional view of an electric power steering unit 1 according to the embodiments of the present disclosure.

<Configuration of Power Steering Unit> FIG. 1 is a longitudinal sectional view of an electric power steering unit 1 according to the embodiments of the present disclosure. As shown in FIG. 1, electric power steering unit 1 is an in-vehicle unit including a steering mechanism 200 and an assist mechanism 300. Steering mechanism 200 is structured to transmit rotation of a steering wheel steered by a driver, to a turning shaft 101 structured to turn a turning wheel. Assist mechanism 300 is an actuator structured to apply an assist force to turning shaft 101.

Components of electric power steering unit 1 is contained in a housing 3. Housing 3 includes a first housing 310, a second housing 320, a motor housing 330 defining a motor container space 3a, and a controller housing 340 defining a controller container space 3b. Motor housing 330 and controller housing 340 is arranged in series in a direction of a rotation axis P of a motor shaft 2a described below, where a partition wall 3c is formed between motor housing 330 and controller housing 340.

Steering mechanism 200 includes a steering input shaft 201 connected to the steering wheel, and a pinion formed at an end of steering input shaft 201 and structured to engage with a rack formed at an outer periphery of turning shaft 101.

Assist mechanism 300 includes a motor 2 and a controller 6. Motor 2 is controlled by controller 6 to output a power depending on a turning torque and a turning amount inputted to the steering wheel by a driver. The output power from motor 2 is transmitted to turning shaft 101 via a ball screw mechanism 90.

Ball screw mechanism 90 includes a nut 91 and an output pulley 92. Output pulley 92 has a cylindrical shape and is integrally rotatably fixed to nut 91. Meanwhile, an input pulley 93 is integrally rotatably fixed to a motor shaft second end 2a2 (described below) of motor shaft 2a of motor 2, wherein rotation axis P of motor shaft 2a serves also as a rotation axis of input pulley 93. Nut 91 has a rotation axis L. Rotation axis L serves also as a rotation axis of output pulley 92 fixed to nut 91.

Rotation axis P is located as being shifted in a radial direction with respect to rotation axis L.

Between output pulley 92 and input pulley 93, a belt 94 made of resin is provided to wrap around output pulley 92 and input pulley 93. Driving force from motor 2 is transmitted to nut 91 via input pulley 93, belt 94, and output pulley 92. Input pulley 93 has an outer diameter smaller than that of output pulley 92. Input pulley 93, output pulley 92, and belt 94 are assembled to form a deceleration mechanism.

Nut 91 has a cylindrical shape formed to surround turning shaft 101, and is rotatable with respect to turning shaft 101. Nut 91 includes in its inner periphery a spiral groove serving as a nut-side ball screw groove 95. Meanwhile, turning shaft 101 includes in its outer periphery a spiral groove serving as a turning-shaft-side ball screw groove 110, apart from a part in which the rack is formed. Turning shaft 101 is inserted in nut 91 such that nut-side ball screw groove 95 and turning-shaft-side ball screw groove 110 form a ball circulation groove 120. In ball circulation groove 120, balls 96 made of metal are packed. When nut 91 rotates, balls 96 move along ball circulation groove 120. This makes turning shaft 101 move in its longitudinal direction, with respect to nut 91.

<Configuration of Motor> Motor 2 includes: motor shaft 2a supported rotatably in motor housing 330; a rotor 2b rotatable integrally with motor shaft 2a; and a stator 2c fixed in motor housing 330. Motor housing 330 has a shape of a cup with bottom, and includes a bottom 330a facing the second housing 320. At a center of bottom 330a, motor housing 330 further includes a shaft insertion hole 330b passing through the bottom 330a in the direction of rotation axis P of motor shaft 2a. Through the shaft insertion hole 330b, motor shaft 2a extends. Motor shaft 2a includes motor shaft second end 2a2 facing the second housing 320 and reaching inside of second housing 320. In addition, housing 3 includes a bearing 80 at a side of bottom 330a, the side facing the second housing 320. Thus, motor shaft 2a is rotatably supported by bearing 80.

Motor housing 330 includes an opening that faces controller housing 340 and is closed by partition wall 3c. Partition wall 3c includes at its center a motor shaft through-hole 3c2 passing through the partition wall 3c in the direction of rotation axis P of motor shaft 2a. Through the motor shaft through-hole 3c2, motor shaft 2a extends. Motor shaft 2a includes a motor shaft first end 2a1 facing the controller housing 340 and reaching inside of controller housing 340. In addition, housing 3 includes a bearing 81 at a side of partition wall 3c, the side facing the motor housing 330. Thus, motor shaft 2a is rotatably supported by bearing 81.

Figure 2:
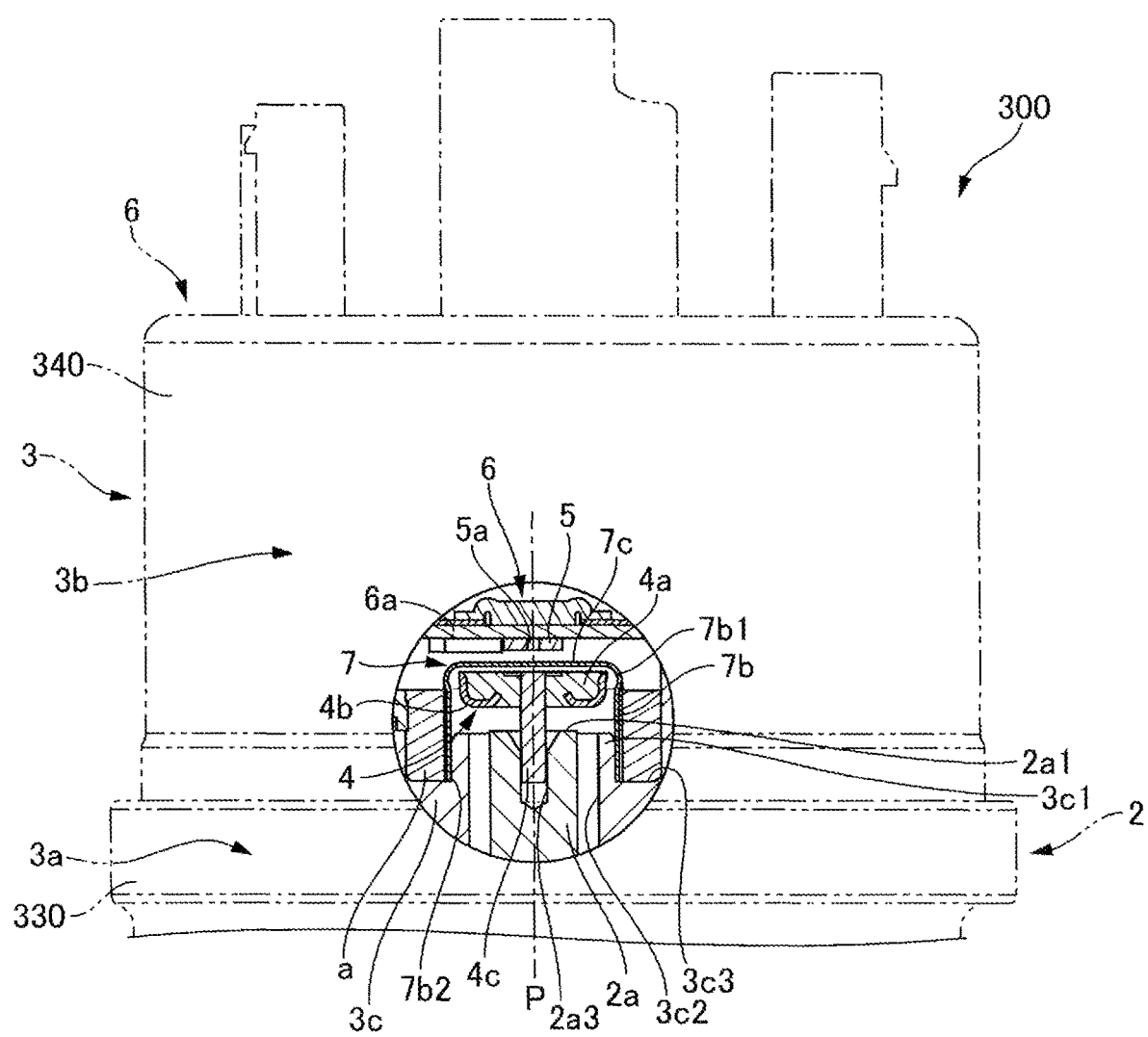
FIG. 2 is a partial sectional view showing how a cover 7 is installed according to a first embodiment.
Figure 3A:
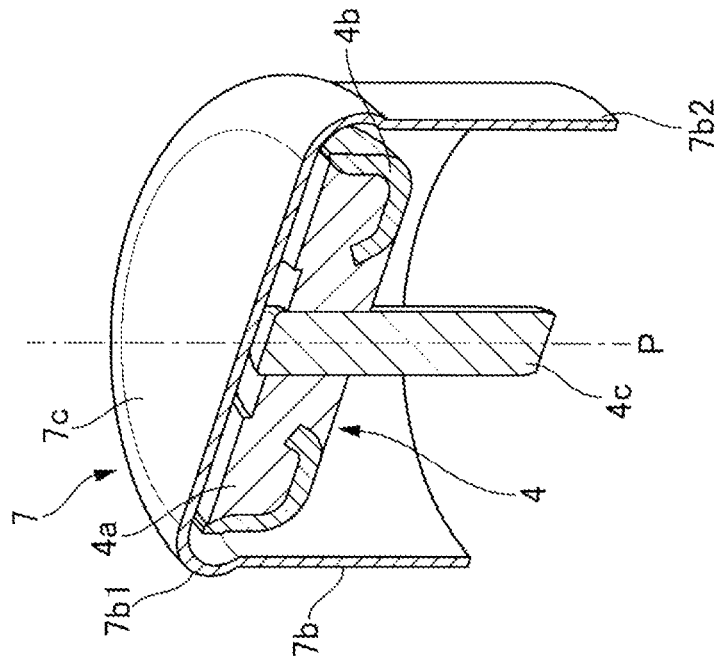
FIG. 3A is an enlarged sectional view of cover 7 and a magnet 4 according to the first embodiment.
Figure 3B:
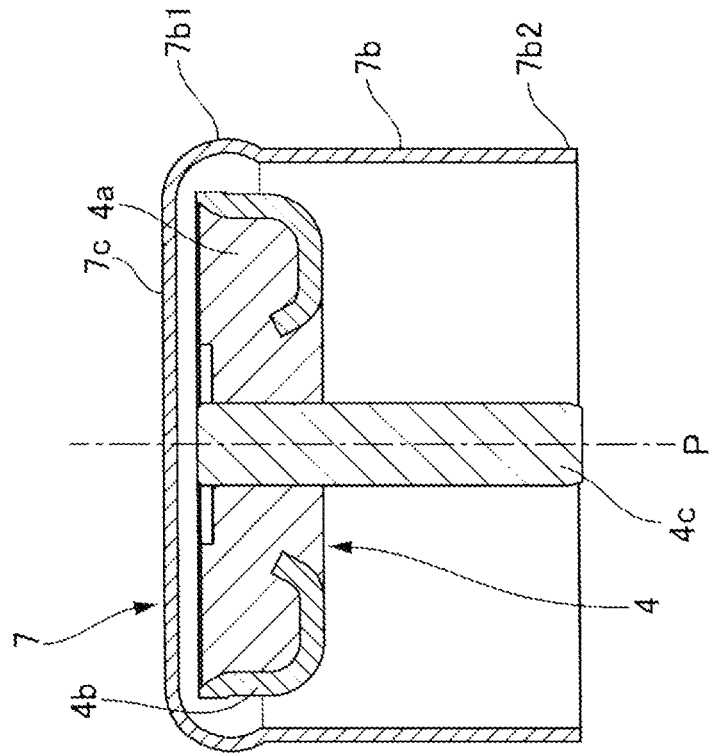
FIG. 3B is an oblique enlarged sectional view of the same.

<Configuration of Rotation Sensor> FIG. 2 is a partial sectional view showing how a cover 7 is installed according to the first embodiment. FIG. 3A is an enlarged sectional view of cover 7 and a magnet 4 according to the first embodiment. FIG. 3B is an oblique enlarged sectional view of the same.

Rotor 2b of motor 2 has a rotational position monitored by a rotation sensor 5. The monitored rotational position is transmitted to controller 6 in control boards 6a. Controller 6 is configured to output a command signal from a power supply part (not shown) to stator 2c on the basis of the rotational position of rotor 2b, in order to control power supply.

Rotation sensor 5 is located on control boards 6a, oppositely to magnet 4 disposed at motor shaft first end 2a1 of motor shaft 2a. Rotation sensor 5 includes at its center a magnetism sensor element 5a configured to monitor variation in magnet field caused when magnet 4 rotates integrally with motor shaft 2a, and output monitored result to controller 6 as the rotational position of rotor 2b (a rotational position of the motor).

Magnet 4 includes a magnet body 4a, a magnet holder 4b, and a magnet support shaft 4c. Magnet body 4a is supported by motor shaft first end 2a1 of motor shaft 2a, via magnet holder 4b in which magnet body 4a is press-fitted. Magnet holder 4b is made of magnetic material such as iron, and formed by injection molding. Magnet support shaft 4c is fixed to a center of magnet body 4a, and press-fitted in an insertion hole 2a3 formed at motor shaft first end 2a1. Thus, magnet 4 is integrated with motor shaft 2a. Magnet body 4a is magnetized to include at least a pair of north pole and south pole arranged in a circumferential direction around rotation axis P of motor shaft 2a.

<Configuration of Cover> Cover 7 includes a cover tube part 7b and a cover lid part 7c. Cover tube part 7b has a tubular shape whose cross section is circular in a plane perpendicular to rotation axis P of motor shaft 2a, and includes a cover-tube-part first end 7b1 and a cover-tube-part second end 7b2 that are ends in a direction of rotation axis P. Cover lid part 7c is formed to close cover-tube-part first end 7b1.

Cover 7 is made of material same in main component with motor housing 330 of housing 3. For example, cover 7 is made of nonmagnetic aluminum alloy same in main component with motor housing 330. This serves to reduce or eliminate a difference in linear expansion coefficient between cover 7 and motor housing 330, and thereby suppress cover 7 and motor housing 330 from undergoing stress due to variation in temperature. Furthermore, this configuration serves to suppress cover 7 and motor housing 330 also from undergoing rust due to a difference in ionization tendency between different metals. In addition, aluminum alloy is less in specific gravity than iron-based metal, and can be more lightweight and inexpensive.

Partition wall 3c of housing 3 includes a projection 3c1 formed to project toward controller container space 3b in the direction of rotation axis P of motor shaft 2a, and formed such that motor shaft through-hole 3c2 of partition wall 3c passes through the projection 3c1. Projection 3c1 has a circular cross section in a plane perpendicular to rotation axis P, and is press-fitted and fixed in cover 7 having the circular cross section, in a direction from cover-tube-part second end 7b2 toward cover-tube-part first end 7b1. This serves to fix cover 7 to partition wall 3c with sufficient fixing strength, without employing an additional member for the fixing. In addition, both of cover tube part 7b and projection 3c1 have the circular cross section. This serves to facilitate press-fitting operation, and allows determining a position of cover 7 in a radial direction upon fixing cover 7 to projection 3c1.

Cover 7 is thus interposed between magnet 4 and rotation sensor 5 to cover the motor shaft through-hole 3c2 of partition wall 3c. This serves to suppress foreign substances in motor container space 3a such as water, grease, and fragments of magnet 4, from entering into controller container space 3b. In addition, cover 7 is made of nonmagnetic metal. This serves to suppress cover 7 from affecting a magnet field from magnet 4, and allows cover 7 to be thinner than resin-made one in order to improve assist mechanism 300 (actuator 300) in ease of layout.

Partition wall 3c further includes an annular groove 3c3 formed to surround a whole circumference of projection 3c1. In annular groove 3c3, a seal agent (a) is filled to adhere to both of cover tube part 7b and projection 3c1, for sealing between cover tube part 7b and projection 3c1. Furthermore, filling operation of seal agent (a) is facilitated by forming a space for the filling (namely, annular groove 3c3) to have an annular groove shape.

According to the first embodiment, the actuator for in-vehicle unit serves to produce the following beneficial effects.

(1) Actuator 300 includes: motor 2 including rotor 2b, stator 2c, and motor shaft 2a, wherein motor shaft 2a includes motor shaft first end 2a1 and motor shaft second end 2a2 that are the ends in the direction of rotation axis P of motor shaft 2a; housing 3 including motor container space 3a, controller container space 3b, and partition wall 3c, wherein partition wall 3c includes motor shaft through-hole 3c2; magnet 4 set to rotate with motor shaft 2a, and including a pair of north pole and south pole arranged in the circumferential direction around rotation axis P of motor shaft 2a; rotation sensor 5 configured to monitor the rotational position of motor shaft 2a, based on the variation in magnetic field from magnet 4 due to the rotation of magnet 4; controller 6 configured to output the command signal to stator 2c, based on the signal from rotation sensor 5; and cover 7 made of nonmagnetic metal and structured to cover the motor shaft through-hole 3c2 of partition wall 3c; wherein: motor 2 is contained in motor container space 3a; motor container space 3a and controller container space 3b are arranged in series in the direction of rotation axis P of motor shaft 2a; partition wall 3c is formed between motor container space 3a and controller container space 3b, in the direction of rotation axis P of motor shaft 2a; motor shaft 2a is inserted in motor shaft through-hole 3c2 of partition wall 3c; magnet 4 is disposed at motor shaft first end 2a1 nearer to controller container space 3b than motor shaft second end 2a2; rotation sensor 5 is located in controller container space 3b, oppositely to magnet 4 in the direction of rotation axis P of motor shaft 2a; controller 6 is contained in controller container space 3b; and cover 7 is disposed on partition wall 3c and between magnet 4 and rotation sensor 5 in the direction of rotation axis P of motor shaft 2a. This serves to suppress the foreign substances in motor container space 3a such as water, grease, and fragments of magnet 4, from entering into controller container space 3b. In addition, cover 7 is made of nonmagnetic metal. This serves to suppress cover 7 from affecting the magnet field from magnet 4, and allows cover 7 to be thinner than resin-made one in order to improve actuator 300 (assist mechanism 300) in ease of layout.

(2) Housing 3 and cover 7 are made of a same kind of material. Specifically, motor housing 330 of housing 3 and cover 7 are made of a same kind of material. This serves to reduce or eliminate the difference in linear expansion coefficient between cover 7 and motor housing 330, and thereby suppress cover 7 and motor housing 330 from undergoing the stress due to variation in temperature. Furthermore, this configuration serves to suppress cover 7 and motor housing 330 from undergoing the rust due to the difference in ionization tendency between different metals.

(3) Housing 3 and cover 7 are made of aluminum alloy. Specifically, Motor housing 330 of housing 3 and cover 7 are made of aluminum alloy. This serves to produce motor housing 330 and cover 7 less in specific gravity than iron-based ones, and more lightweight and inexpensive.

(4) Cover 7 includes cover tube part 7b and cover lid part 7c; cover tube part 7b has the tubular shape, and includes cover-tube-part first end 7b1 and cover-tube-part second end 7b2 that are the ends in the direction of rotation axis P of motor shaft 2a; cover lid part 7c is formed to close the cover-tube-part first end 7b1; partition wall 3c of housing 3 further includes projection 3c1 formed to project from partition wall 3c toward controller container space 3b in the direction of rotation axis P of motor shaft 2a, and formed such that motor shaft through-hole 3c2 passes through the projection 3c1; and projection 3c1 is press-fitted in cover tube part 7b, in the direction from cover-tube-part second end 7b2 toward cover-tube-part first end 7b1. This serves to fix cover 7 to partition wall 3c with sufficient fixing strength, without employing an additional member for the fixing.

(5) Each of cover tube part 7b and projection 3c1 has a circular cross section in a plane perpendicular to rotation axis P of motor shaft 2a. This serves to facilitate the press-fitting operation, and allows determining the position of cover 7 in the radial direction upon fixing cover 7 to projection 3c1.

(6) Actuator 300 further includes seal agent (a), wherein: partition wall 3c of housing 3 further includes annular groove 3c3 formed to surround the projection 3c1; and seal agent (a) is filled in annular groove 3c3 to adhere to cover tube part 7b of cover 7 and projection 3c1 of partition wall 3c. This serves for the sealing between cover tube part 7b and projection 3c1. Furthermore, the filling operation of seal agent (a) is facilitated by forming the space for the filling (namely, annular groove 3c3) to have an annular groove shape.

Second Embodiment

Figure 4:
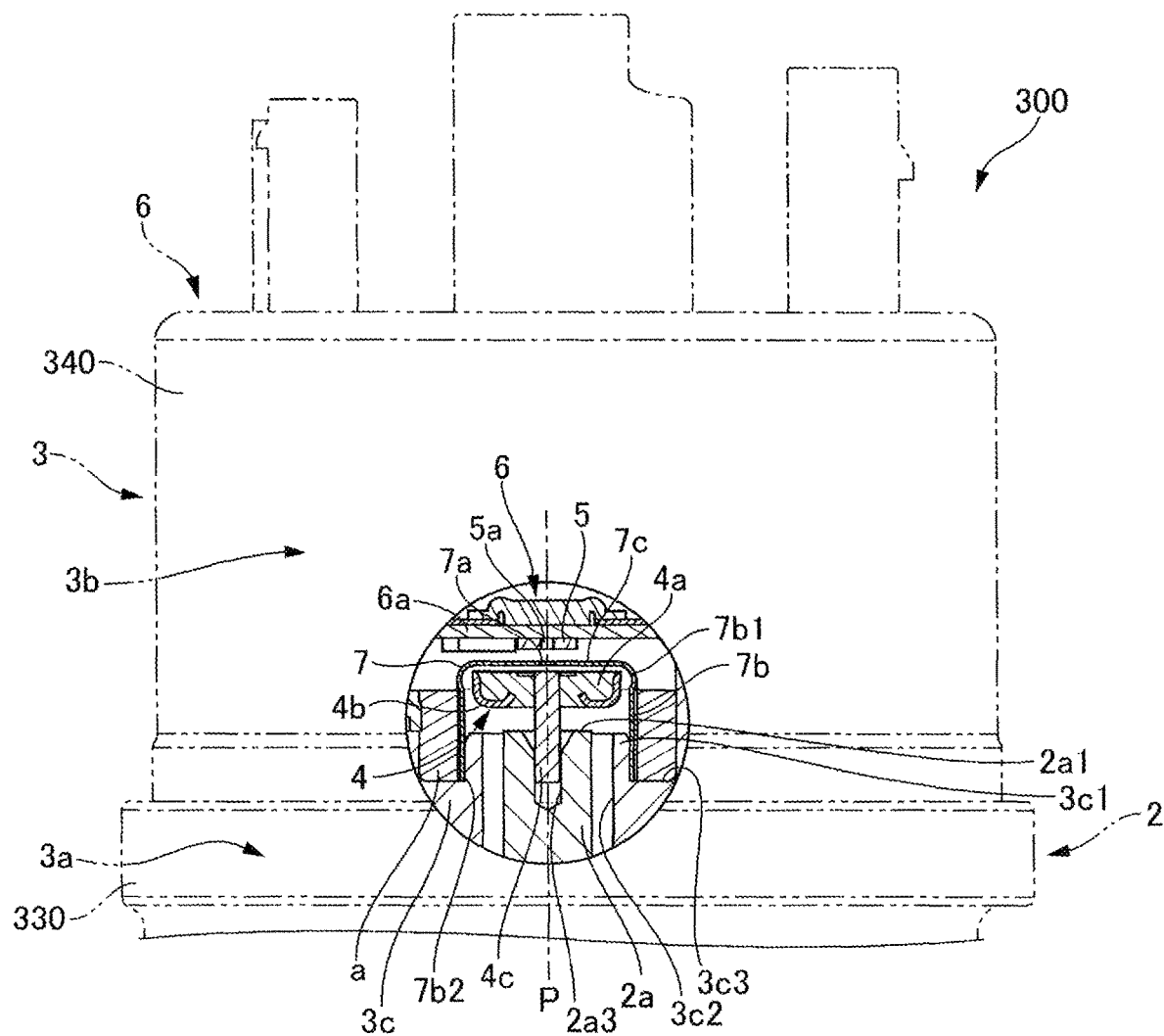
FIG. 4 is a partial sectional view showing how cover 7 is installed according to a second embodiment.
Figure 5B:
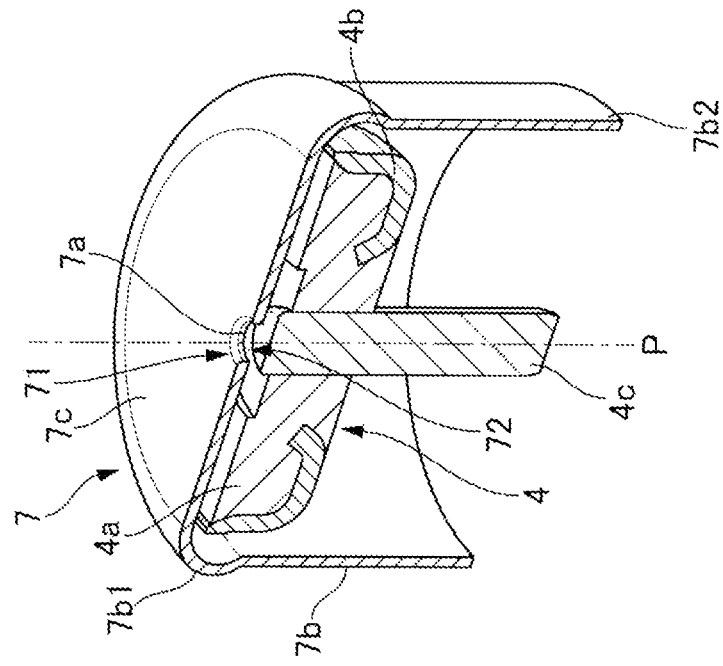
FIG. 5B is an oblique enlarged sectional view of the same.
Figure 5A:
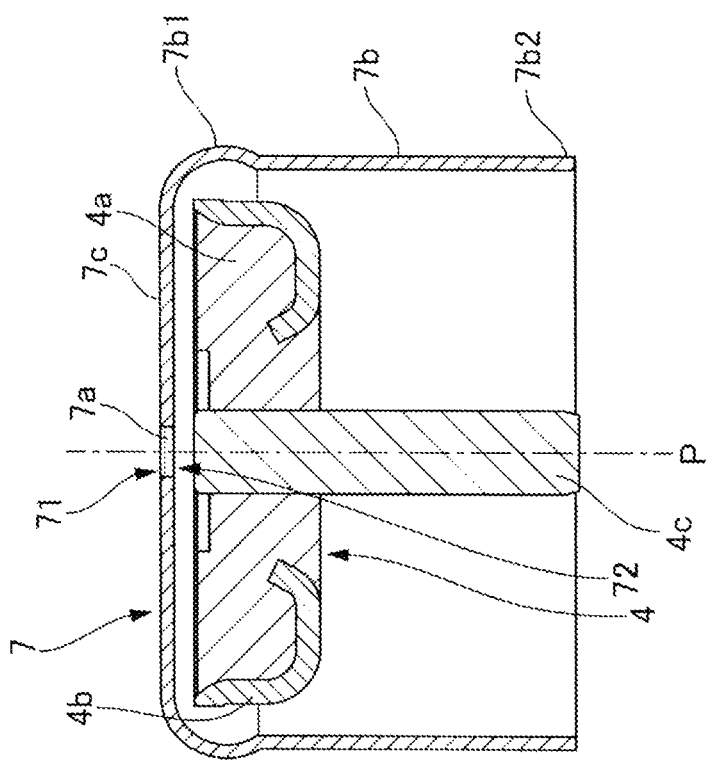
FIG. 5A is an enlarged sectional view of cover 7 and magnet 4 according to the second embodiment.

FIG. 4 is a partial sectional view showing how cover 7 is installed according to a second embodiment. FIG. 5A is an enlarged sectional view of cover 7 and magnet 4 according to the second embodiment. FIG. 5B is an oblique enlarged sectional view of the same.

Figure 8:
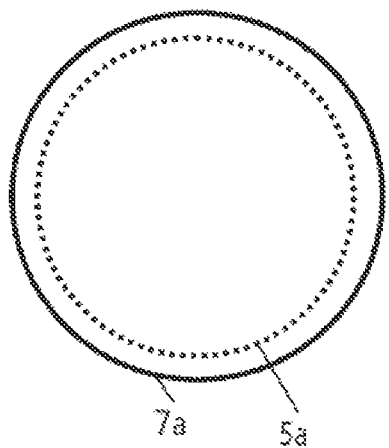
FIG. 8 is a cross-sectional view of at least a portion of a cover according to at least the second embodiment.
Figure 9:
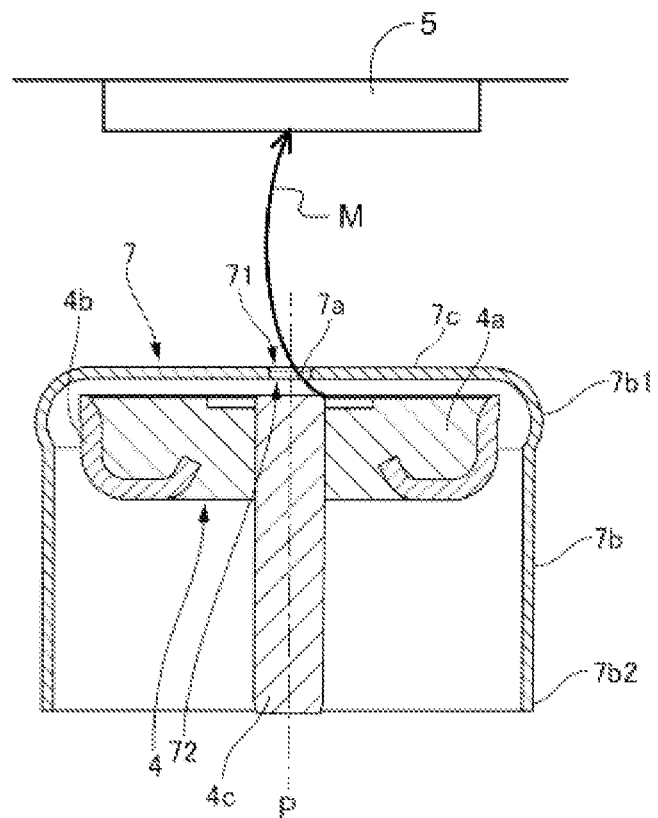
FIG. 9 is an enlarged sectional view of a cover according to at least the second embodiment.

According the second embodiment, contrary to the first embodiment, cover 7 includes a cover through-hole 7a formed in cover lid part 7c oppositely to magnet 4 in the direction of rotation axis P of motor shaft 2a. Cover through-hole 7a is formed to overlap with rotation axis P and surround the magnetism sensor element 5a, as viewed in the direction of rotation axis P, as reflected in FIG. 8. Furthermore, cover through-hole 7a has a size sufficient to allow a line of magnetic force M from magnet 4 to reach the rotation sensor 5 directly without being intercepted by cover 7, as reflected in FIG. 9. Other configurations are the same as with the first embodiment.

According to the second embodiment, the actuator for in-vehicle unit serves to produce the following beneficial effects in addition to that according to the first embodiment.

(1) Although cover 7 is made of nonmagnetic material, cover 7 is likely to undergo eddy current due to variation in magnetic field. The formation of cover through-hole 7a serves to form a region with no eddy current, and thereby improve rotation sensor 5 in monitoring precision.

(2) Cover through-hole 7a is located at a position on rotation axis P of motor shaft 2a contributing significantly to the monitoring of the variation in magnet field from magnet 4. This serves to further improve rotation sensor 5 in monitoring precision.

(3) Cover through-hole 7a has the location and the size that are set to surround the magnetism sensor element 5a as viewed in the direction of rotation axis P, such that magnet 4 and magnetism sensor element 5a face with each other directly without being intercepted by cover 7. This serves to suppress monitoring precision of magnet field from deteriorating.

(4) Cover through-hole 7a has a size sufficient to allow a line of magnetic force from magnet 4 to reach the rotation sensor 5 directly without being intercepted by cover 7. This serves to further improve rotation sensor 5 in monitoring precision.

Third Embodiment

Figure 6:
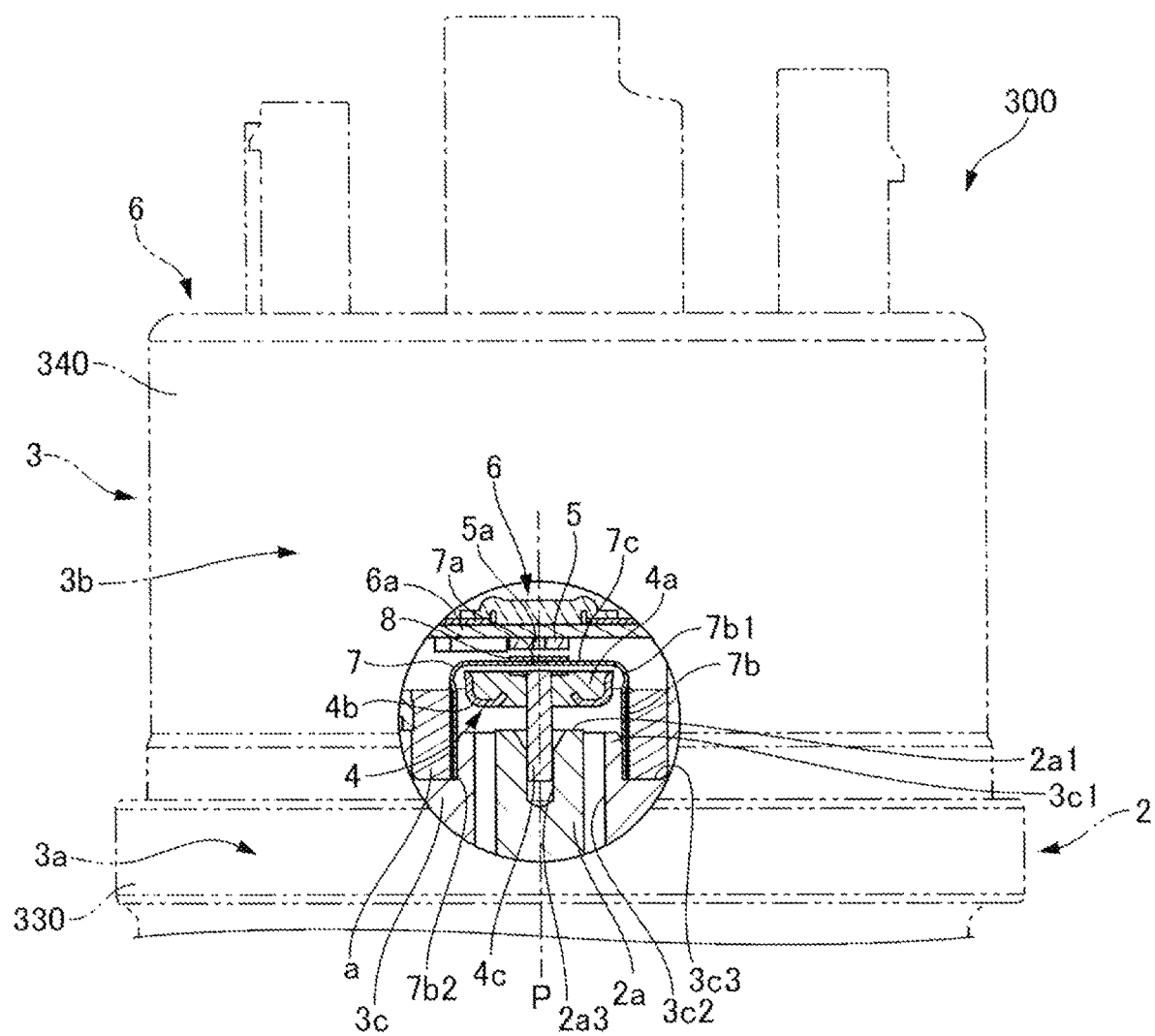
FIG. 6 is a partial sectional view showing how cover 7 is installed according to a third embodiment.
Figure 7:
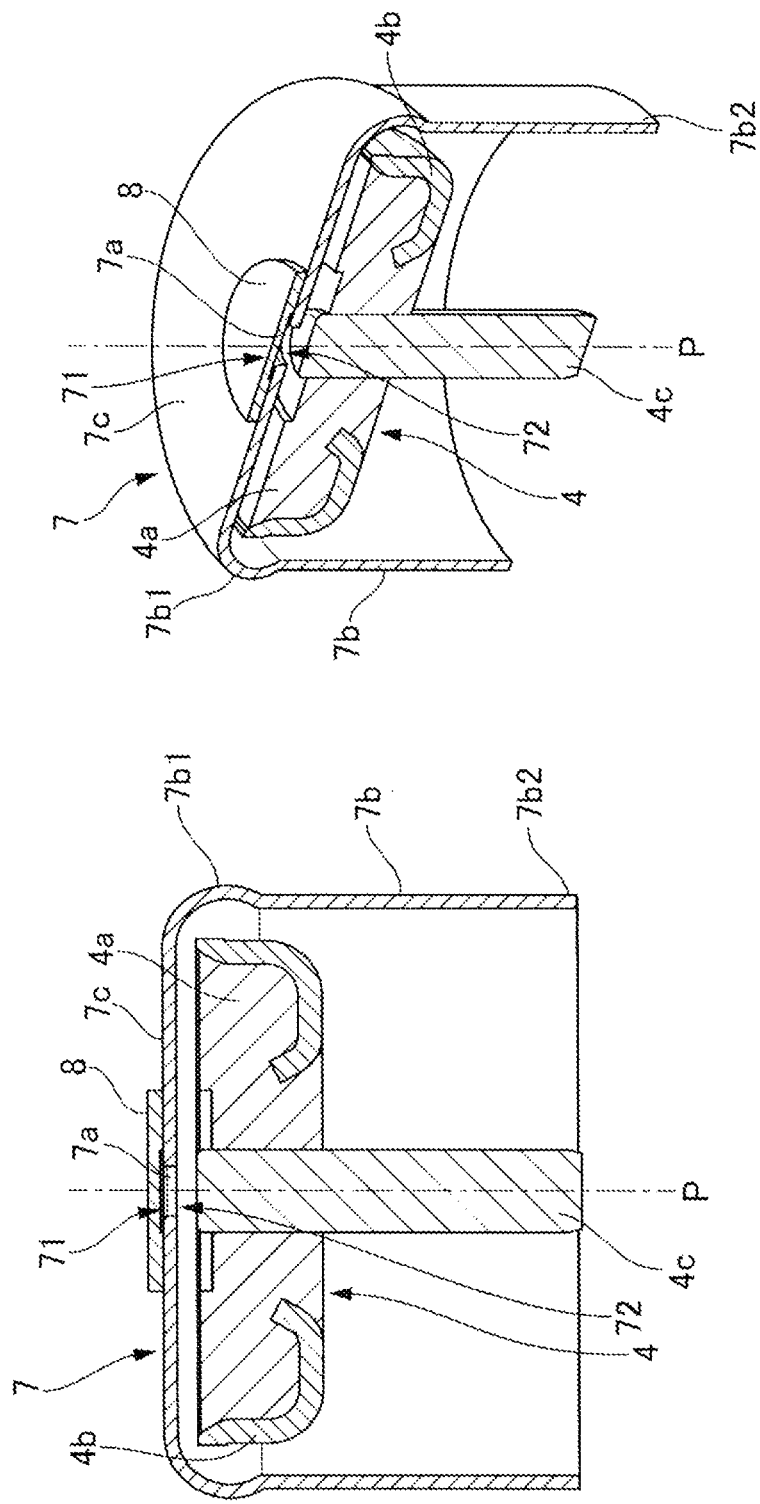
FIG. 7A is an enlarged sectional view of cover 7 and magnet 4 according to the third embodiment.
FIG. 7B is an oblique enlarged sectional view of the same.

FIG. 6 is a partial sectional view showing how cover 7 is installed according to a third embodiment. FIG. 7A is an enlarged sectional view of cover 7 and magnet 4 according to the third embodiment. FIG. 7B is an oblique enlarged sectional view of the same.

According to the third embodiment, contrary to the second embodiment, cover 7 includes a waterproof breathable film 8 formed to close cover through-hole 7a. Waterproof breathable film 8 serves to suppress moisture in motor container space 3a from permeating into controller container space 3b, and allows ventilation between motor container space 3a and controller container space 3b. Waterproof breathable film 8 is disposed nearer to a cover-through-hole first end 71 than to a cover-through-hole second end 72, wherein: cover through-hole 7a includes cover-through-hole first end 71 and cover-through-hole second end 72 that are ends in the direction of rotation axis P of motor shaft 2a; and cover-through-hole first end 71 is nearer to rotation sensor 5 than cover-through-hole second end 72. Other configurations are same with the second embodiment.

According to the third embodiment, the actuator for in-vehicle unit serves to produce the following beneficial effects in addition to that according to the second embodiment.

(1) Waterproof breathable film 8 is formed to close the cover through-hole 7a. This serves to suppress the moisture in motor container space 3a from permeating into controller container space 3b, while allowing the ventilation between motor container space 3a and controller container space 3b. For example, in case that air inside the controller container space 3b has expanded due to rise in temperature, waterproof breathable film 8 allows the air inside the controller container space 3b to move into motor container space 3a, and thereby serves to suppress rise in pressure inside the controller container space 3b from affecting components in controller container space 3b and peripheral members thereof.

(2) Waterproof breathable film 8 is disposed nearer to cover-through-hole first end 71 facing rotation sensor 5, than to cover-through-hole second end 72. This serves to increase a distance between magnet 4 rotating and waterproof breathable film 8, and thereby suppress them from interfering with each other.

Other Embodiments

The present disclosure may be implemented by various embodiments unlimited to the above embodiments, and be freely modified without departing from scope of the present disclosure.

The following summarizes features of the embodiments of the present disclosure.

An actuator (300) for an in-vehicle unit includes: a motor (2) including a rotor (2b), a stator (2c), and a motor shaft (2a), wherein the motor shaft (2a) includes a motor shaft first end (2a1) and a motor shaft second end (2a2) that are ends in a direction of a rotation axis (P) of the motor shaft (2a); a housing (3) including a motor container space (3a), a controller container space (3b), and a partition wall (3c), wherein the partition wall (3c) includes a motor shaft through-hole (3c2); a magnet (4) set to rotate with the motor shaft (2a), and including a pair of north pole and south pole arranged in a circumferential direction around the rotation axis (P) of the motor shaft (2a); a rotation sensor (5) configured to monitor a rotational position of the motor shaft (2a), based on variation in magnetic field from the magnet (4) due to rotation of the magnet (4); a controller (6) configured to output a command signal to the stator (2c), based on a signal from the rotation sensor (5); and a cover (7) made of nonmagnetic metal and structured to cover the motor shaft through-hole (3c2) of the partition wall (3c); wherein: the motor (2) is contained in the motor container space (3a); the motor container space (3a) and the controller container space (3b) are arranged in series in the direction of the rotation axis (P) of the motor shaft (2a); the partition wall (3c) is formed between the motor container space (3a) and the controller container space (3b), in the direction of the rotation axis (P) of the motor shaft (2a); the motor shaft (2a) is inserted in the motor shaft through-hole (3c2) of the partition wall (3c); the magnet (4) is disposed at the motor shaft first end (2a1) nearer to the controller container space (3b) than the motor shaft second end (2a2); the rotation sensor (5) is located in the controller container space (3b), oppositely to the magnet (4) in the direction of the rotation axis (P) of the motor shaft (2a); the controller (6) is contained in the controller container space (3b); and the cover (7) is disposed on the partition wall (3c) and between the magnet (4) and the rotation sensor (5) in the direction of the rotation axis (P) of the motor shaft (2a).

According to one aspect of the embodiments, the housing (3) and the cover (7) are made of a same kind of material.

According to another aspect of the embodiments: the housing (3) further includes a motor housing (330) defining the motor container space (3a); and the motor housing (330) and the cover (7) are made of a same kind of material.

According to still another aspect of the embodiments, the housing (3) and the cover (7) are made of aluminum alloy.

According to still another aspect of the embodiments: the housing further includes the motor housing defining the motor container space; and the motor housing and the cover are made of aluminum alloy.

According to still another aspect of the embodiments, the cover (7) includes a cover through-hole (7a) located oppositely to the magnet (4) in the direction of the rotation axis (P) of the motor shaft (2a).

T According to still another aspect of the embodiments, the cover through-hole (7a) is formed to overlap with the rotation axis (P) of the motor shaft (2a), as viewed in the direction of the rotation axis (P) of the motor shaft (2a).

According to still another aspect of the embodiments, the cover (7) further includes a waterproof breathable film (8) formed to close the cover through-hole (7a), and suppress moisture in the motor container space (3a) from permeating into the controller container space (3b), and allow ventilation between the motor container space (3a) and the controller container space (3b).

According to still another aspect of the embodiments: the cover through-hole (7a) includes a cover-through-hole first end (71) and a cover-through-hole second end (72) that are ends in the direction of the rotation axis (P) of the motor shaft (2a); the cover-through-hole first end (71) is nearer to the rotation sensor (5) than the cover-through-hole second end (72); and the waterproof breathable film (8) is disposed nearer to the cover-through-hole first end (71) than to the cover-through-hole second end (72).

According to still another aspect of the embodiments: the rotation sensor (5) includes a magnetism sensor element (5a) configured to monitor the variation in magnetic field from the magnet (4); and the cover through-hole (7a) is formed to surround the magnetism sensor element (5a), as viewed in the direction of the rotation axis (P) of the motor shaft (2a).

According to still another aspect of the embodiments, the cover through-hole (7a) has a size sufficient to allow a line of magnetic force from the magnet (4) to reach the rotation sensor (5) directly without being intercepted by the cover (7).

According to still another aspect of the embodiments: the cover (7) includes a cover tube part (7b) and a cover lid part (7c); the cover tube part (7b) has a tubular shape, and includes a cover-tube-part first end (7b1) and a cover-tube-part second end (7b2) that are ends in the direction of the rotation axis (P) of the motor shaft (2a); the cover lid part (7c) is formed to close the cover-tube-part first end (7b1); the partition wall (3c) of the housing (3) further includes a projection (3c1) formed to project from the partition wall (3c) toward the controller container space (3b) in the direction of the rotation axis (P) of the motor shaft (2a), and formed such that the motor shaft through-hole (3c2) passes through the projection (3c1); and the projection (3c1) is press-fitted in the cover tube part (7b), in a direction from the cover-tube-part second end (7b2) toward the cover-tube-part first end (7b1).

According to still another aspect of the embodiments, the actuator (300) further includes a seal agent (a), wherein: the partition wall (3c) of the housing (3) further includes an annular groove (3c3) formed to surround the projection (3c1); and the seal agent (a) is filled in the annular groove (3c3) to adhere to the cover tube part (7b) of the cover (7) and the projection (3c1) of the partition wall (3c).

According to still another aspect of the embodiments, each of the cover tube part (7b) and the projection (3c1) has a circular cross section in a plane perpendicular to the rotation axis (P) of the motor shaft (2a).

The entire contents of Japanese Patent Application 2018-175816 filed Sep. 20, 2018 are incorporated herein by reference.

The invention claimed is:

1. An actuator for an in-vehicle unit, the actuator comprising:
   a motor including a rotor, a stator, and a motor shaft, wherein the motor shaft includes a motor shaft first end and a motor shaft second end that are ends in a direction of a rotation axis of the motor shaft;
   a housing including a motor container space, a controller container space, and a partition wall, wherein the partition wall includes a motor shaft through-hole;
   a magnet set to rotate with the motor shaft, and including a pair of north pole and south pole arranged in a circumferential direction around the rotation axis of the motor shaft;
   a rotation sensor configured to monitor a rotational position of the motor shaft, based on variation in magnetic field from the magnet due to rotation of the magnet;
   a controller configured to output a command signal to the stator, based on a signal from the rotation sensor; and
   a cover comprising nonmagnetic metal and structured to cover the motor shaft through-hole of the partition wall;
   wherein:
   the motor is contained in the motor container space;
   the motor container space and the controller container space are arranged in series in the direction of the rotation axis of the motor shaft;
   the partition wall is disposed between the motor container space and the controller container space, in the direction of the rotation axis of the motor shaft;
   the motor shaft is inserted in the motor shaft through-hole of the partition wall;
   the magnet is disposed at the motor shaft first end nearer to the controller container space than the motor shaft second end;
   the rotation sensor is located in the controller container space, oppositely to the magnet in the direction of the rotation axis of the motor shaft;
   the controller is contained in the controller container space;
   the cover is disposed on the partition wall and between the magnet and the rotation sensor in the direction of the rotation axis of the motor shaft;
   the cover includes a cover through-hole located oppositely to the magnet in the direction of the rotation axis of the motor shaft;
   the rotation sensor includes a magnetism sensor element configured to monitor the variation in magnetic field from the magnet; and
   the cover through-hole is structured to surround the magnetism sensor element, as viewed in the direction of the rotation axis of the motor shaft.

2. The actuator according to claim 1, wherein the housing and the cover are made of a same kind of material.

3. The actuator according to claim 2, wherein:
   the housing further includes a motor housing defining the motor container space; and
   the motor housing and the cover are made of a same kind of material.

4. The actuator according to claim 2, wherein the housing and the cover are made of aluminum alloy.

5. The actuator according to claim 4, wherein:
   the housing further includes a motor housing defining the motor container space; and
   the motor housing and the cover are made of aluminum alloy.

6. The actuator according to claim 1, wherein the cover through-hole is formed to overlap with the rotation axis of the motor shaft, as viewed in the direction of the rotation axis of the motor shaft.

7. The actuator according to claim 1, wherein the cover further includes a waterproof breathable film disposed to close the cover through-hole, and configured to suppress moisture in the motor container space from permeating into the controller container space, and allow ventilation between the motor container space and the controller container space.

8. The actuator according to claim 7, wherein:
   the cover through-hole includes a cover-through-hole first end and a cover-through-hole second end that are ends in the direction of the rotation axis of the motor shaft;
   the cover-through-hole first end is nearer to the rotation sensor than the cover-through-hole second end; and
   the waterproof breathable film is disposed nearer to the cover-through-hole first end than to the cover-through-hole second end.

9. The actuator according to claim 1, wherein the cover through-hole has a size sufficient to allow magnetic force from the magnet to reach the rotation sensor directly without being intercepted by the cover.

10. The actuator according to claim 1, wherein:
    the cover includes a cover tube part and a cover lid part;
    the cover tube part has a tubular shape, and includes a cover-tube-part first end and a cover-tube-part second end that are ends in the direction of the rotation axis of the motor shaft;
    the cover lid part is formed to close the cover-tube-part first end;

the partition wall of the housing further includes a projection formed to project from the partition wall toward the controller container space in the direction of the rotation axis of the motor shaft, and formed such that the motor shaft through-hole passes through the projection; and the projection is press-fitted in the cover tube part, in a direction from the cover-tube-part second end toward the cover-tube-part first end.

11. The actuator according to claim 10, further comprising a seal agent, wherein:

the partition wall of the housing further includes an annular groove formed to surround the projection; and the seal agent is filled in the annular groove to adhere to the cover tube part of the cover and the projection of the partition wall.

12. The actuator according to claim 10, wherein each of the cover tube part and the projection has a circular cross section in a plane perpendicular to the rotation axis of the motor shaft.

* * * * *